United States Patent [19]

Ayres et al.

[11] Patent Number: 5,446,872
[45] Date of Patent: Aug. 29, 1995

[54] METHOD FOR ERROR RECOVERY IN A NON-SYNCHRONOUS CONTROL UNIT

[75] Inventors: Kathryn J. Ayres; Brent C. Beardsley; Keith A. Bello; Michael T. Benhase; Donald M. Nordahl, all of Tucson, Ariz.; Alfred G. Torre, Lafayette; Bao T. Trieu, San Jose, both of Calif.; Linda D. VanPatten, Tucson, Ariz.

[73] Assignee: International Business Machines Corporation, Armonk, N.Y.

[21] Appl. No.: 82,349

[22] Filed: Jun. 23, 1993

Related U.S. Application Data

[63] Continuation of Ser. No. 575,734, Aug. 31, 1990, abandoned.

[51] Int. Cl.⁶ ............................................. G06F 11/00
[52] U.S. Cl. ................................... 395/180; 371/5.4; 371/40.1; 371/42
[58] Field of Search ................ 395/575; 371/40.1, 5.4, 371/42

[56] References Cited

U.S. PATENT DOCUMENTS

| | | | |
|---|---|---|---|
| 4,779,189 | 10/1988 | Legvold et al. | 364/200 |
| 4,974,147 | 11/1990 | Hanrahan et al. | 364/DIG. 1 |
| 5,155,814 | 10/1992 | Beardley et al. | 395/275 |
| 5,235,692 | 8/1993 | Ayres et al. | 395/425 |

Primary Examiner—Robert W. Beausoliel, Jr.
Assistant Examiner—Ly V. Hua
Attorney, Agent, or Firm—Greenlee and Winner

[57] ABSTRACT

An error recovery process for a non-synchronous DASD control unit. A channel process within the control unit is able to operate on different fields from a device process within the control unit. Independent errors may be sensed by each process. The error recovery process provides for restarting only the trailing process and deferring handling of the error sensed by the leading process, whenever possible.

12 Claims, 7 Drawing Sheets

| TABLE 1. RULES FOR STORING DATA INTO THE BUFFER | | |
|---|---|---|
| WRAP | END OF BUFFER FILLER POINTER COMPARED TO BUFFER EMPTIER POINTER | ACTION. |
| 0 | ANY | OK TO PROCEED |
| 1 | < | OK TO PROCEED |
| 1 | ≥ | DIP REORIENT CHIP FILLS AVAILABLE BUFFER SPACE WITH DATA NOTE: "END OF BUFFER FILLER POINTER" POINTS TO LOCATION IN THE BUFFER WHERE AVAILABLE SPACE ENDS FOR THE LEADING (FILLING) PROCESS. |

| TABLE 2. RULES FOR REMOVING DATA FROM THE BUFFER | | |
|---|---|---|
| WRAP | BUFFER FILLER POINTER COMPARED TO BUFFER EMPTIER POINTER | ACTION. |
| 1 | ANY | OK TO PROCEED |
| 0 | > | OK TO PROCEED |
| 0 | = | DIP — WAIT FOR NOFVAL = 1 CHIP COUNT — WAIT FOR DORF.F ≥ 3 KEY — WAIT FOR DORF.F ≥ 5 DATA — WAIT FOR DORF.F ≥ 6 |
| 0 | < | MUST WAIT |

FIG. 3.

METHOD FOR ERROR RECOVERY IN A NON-SYNCHRONOUS CONTROL UNIT

This is a continuation of application Ser. No. 07/575,734, filed on Aug. 31, 1990, now abandoned.

This invention relates to data processing systems and, more particularly, to control of DASD peripheral data processing systems operating in a nonsynchronous manner.

BACKGROUND OF THE INVENTION

Data processing systems frequently include large scale storage devices, such as Direct Access Storage Devices (DASD), located externally to the host computer and sometimes at significant distances therefrom. Communication from the host computer to the DASD is accomplished over signal cables, called channels, extending between the DASD and its control unit and connecting them to the host processor.

Current technology provides DASD units with several separate disks, all rotating on the same spindle. These disks, or platters, are accessed by head disk assemblies with a transducing head providing access to one surface of each disk. There may be, for example, nine platters in a disk drive providing 16 usable surfaces with one of the usable surfaces used for maintaining accurate tracking capability. In such units, there are 15 usable surfaces for data and when all the heads are positioned, a cylinder of 15 physical, recording tracks can be accessed. DASD units frequently use a Count Key Data architecture (CKD) where records written on the track are provided with a count field (an ID), a key field and a data field.

In writing these fields along a recording track, a gap is provided between each of the fields. Those gaps are then utilized to provide a time period in which the DASD control unit and the host channel can communicate with each other. It is during the gap time that the control unit provides information back to the Channel in response to the command that it has received and gets the next command in order to begin the next operation for searching, retrieving or writing records. This process is termed gap synchronous, that is to say, that the particular record on which the DASD device is working, is the same record on which the channel has requested work, so that both the channel and the device are synchronous with each other in the sense that they are both working on the same record, either to read it or to write it.

As systems become faster and faster, the delays created by the gaps or by the performance of functions within a gap period have to be shrunk to such an extent that the functions can no longer be adequately performed. This is particularly true of optical fiber channels where the data burst rate is several times the burst rate for copper channels.

Nonsynchronous storage subsystems are developed to enable the channel and the device to transfer data independently of each other. To do that, a buffer has been inserted into the data path between the device and the channel with separate data paths for the channel and the device, each under the control of separate processors. In that manner, the device processor can access records in one portion of the buffer while another portion of the buffer is being used by the channel processor. Channel programs can be executed such that the channel and storage control activities required to end execution of one command and advance to the next do not have to occur during the inter-record gap between two adjacent fields.

In a synchronous system, the device and channel operate on the same record so that the data transferred to the buffer by the device is the same data that the channel wants. In the control unit for such a system, shared variables are all that are required to implement the interface between the channel processor and the device processor. Simple shared variables are adequate because the channel processor and device processor are always performing the same operation on the same field. In a nonsynchronous system, however, the device may operate significantly ahead of the channel during read operations. The device processor is transferring data into the buffer from the device while the channel processor is accessing that data in order to send it on to the channel. The device processor is therefore the filling or leading activity, while the channel processor is the trailing or lagging activity. The reverse is true during write operations where the channel processor fills the buffer with data from the channel and, subsequently, the device processor accesses that data to send it to the device for writing the records on the storage disks. In this instance, the channel processor is the leading, or filling activity while the device processor is the trailing, or emptying activity. Since in a nonsynchronous control unit the channel and the device processors can be performing different operations on different fields, a more elaborate communication system between the two is required and is set forth herein.

Error recovery in a non-synchronous control unit must also take into account considerations which are not present in a synchronous control unit. In synchronous operation, since the channel interface processor and the device interface processor are operating on the same field, if an error occurs, the two processors in all likelihood will be noting the same error. In a non-synchronous operation it is still a reasonable assumption that two independent errors will not happen simultaneously. Nevertheless, since the channel interface processor (CHIP) and the device interface processor (DIP) are not working on the same fields at the same time it is a more distinct possibility. For example, DIP could be running considerably ahead of CHIP on read operations and run into a data check. CHIP coming along behind could run into a data overrun. The two errors are independent so there must be some way to handle a situation such as this and to recover from both of the errors. It is also possible in such a situation that since the device is considerably ahead of the channel, the error that the device encounters might be with regard to a record that the channel does not need to complete its operation. This occurs because the device processor acts to read sequential records into the buffer, starting with the first record requested by the command chain of channel command words (CCW). While the initial requested record is known to DIP, it operates ahead of CHIP and, therefore, does not know which successive records the channel requires. As a consequence, CHIP may reach the end of the records needed for the read operation before it reaches the record upon which DIP found an error. In such case, the channel program can be completed successfully without caring about the error that the leading processor noted.

An object of this invention is to provide an error recovery method for a non-synchronous control unit which recovers from single errors in the most efficient manner possible.

Another object of this invention is to recover from multiple errors in the most efficient manner possible.

Another object is to provide an error recovery method wherein multiple errors are handled as single errors insofar as possible.

SUMMARY OF THE INVENTION

This invention is an error recovery process for a DASD control unit operating in a non-synchronous manner, that is, where a channel process within the control unit is able to operate on different fields from a device process within the control unit. The general rule of the error recovery process is that after recovery from a retryable error reported by the trailing process, the trailing process is restarted and allowed to catch up to the leading process before handling errors reported by the leading process. There are exceptions to this general rule which are discussed herein.

BRIEF DESCRIPTION OF THE DRAWING

The above-mentioned and other features and objects of this invention and the manner of attaining them will become more apparent and the invention itself will best be understood by reference to the following description of embodiments of the invention taken in conjunction with the accompanying drawing, the description of which follows.

FIG. 3, comprised of tables 1 and 2, shows rules for storing data into and removing data from the buffer.

DETAILED DESCRIPTION OF THE DRAWINGS

To operate nonsynchronously, an Extended CKD architecture (ECKD) has been developed to permit channel programs to describe the nature and scope of a data transfer before the first data transfer command is executed. ECKD includes a locate record extended command which uses a variable length parameter list to define the operational domain for a subsequent Channel Command Word (CCW) chain. The parameters specify the operation to be performed, the location and number of records or tracks to be processed, and the transfer length factor. In that manner, the storage subsystem is informed of the type of data transfer to be performed, the number of records to be operated upon, and the track sector and record ID to which the device must be positioned prior to initiating data transfer.

Nonsynchronous operation does not define how far apart in time the channel and device operations must be, and does not limit how far apart they can be. During read operations, the device control can read a few bytes, a field, a record, or even several records into the buffer before the first read command is executed. In write operations, the channel control can receive one or more write commands and transfer the associated data into a buffer before the first field is written to the device.

ECKD uses the same track addressing scheme as the well-known CKD scheme. The track is the smallest directly addressable space on a device, and each track has an arbitrary starting point called an index. The track format is the same in ECKD as it is in CKD. The first area on the track is the home address, which identifies the track, and is followed by a special record called record zero containing the address of the track. Record zero is then followed by a data area containing user records.

Before data transfer can begin, the device control must be oriented. It does that by detecting either the index point or the start-of-count area other than record zero. Once the count area, or index, has been detected, the device control can work its way down the track to perform the operations commanded by the channel.

After validating the locate record parameters, the control unit directs the device to seek to a first-specified track, positions the device to the designated sector, and begins a search operation to further position itself to a particular record area on the track.

Figure 1:
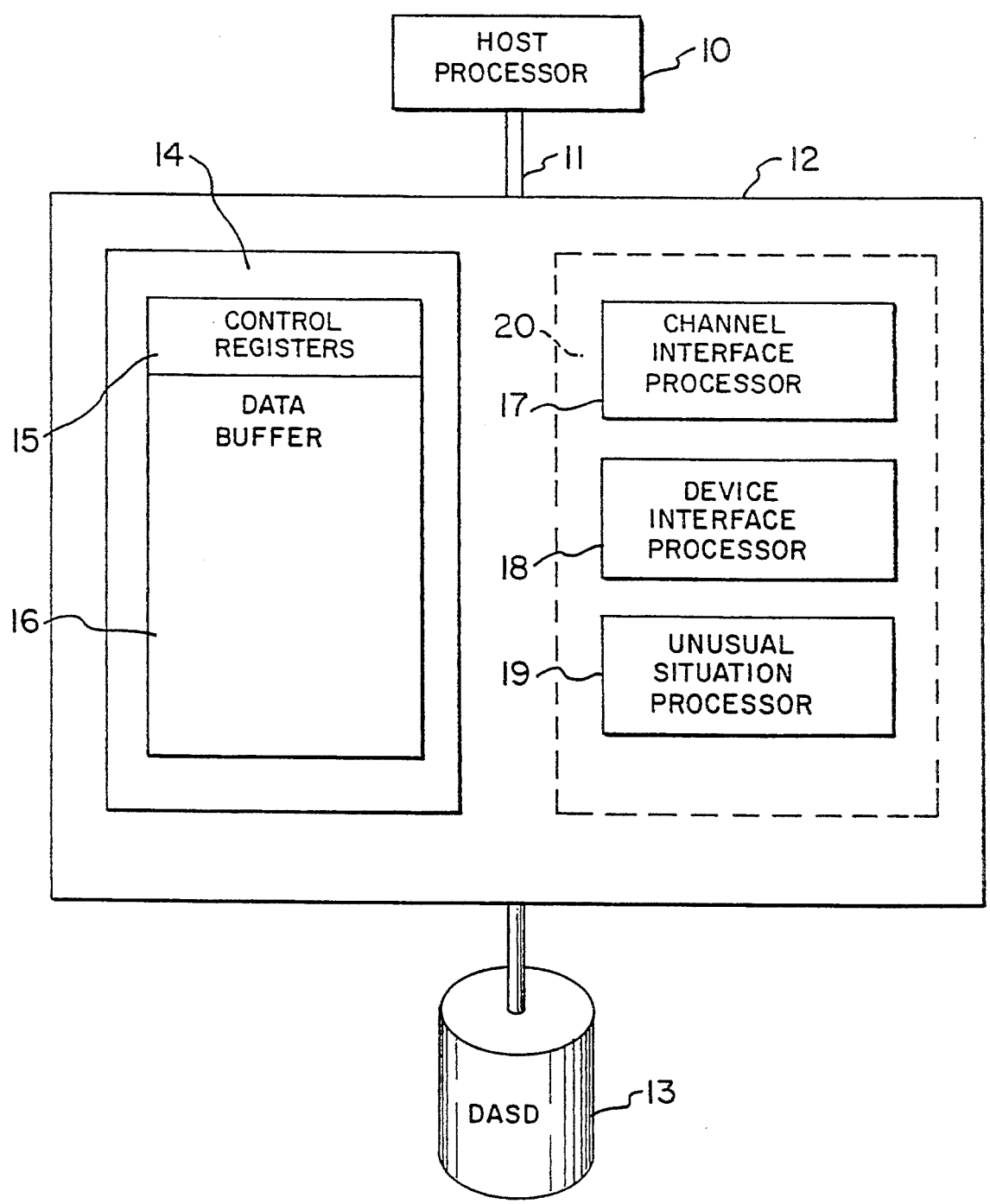
FIG. 1 shows a simplified block diagram of a data processing system including the instant invention.

FIG. 1 shows a simplified block diagram of a data processing system including the instant invention. Host processor 10 is connected by a channel 11 to a control unit 12. Control unit 12 and DASD 13 comprise a peripheral data processing subsystem for managing storage activities on the DASD. FIG. 1 is simplified. Actually there may be several channels 11 connected to the control unit 12. At the current time, one common configuration has 16 channels connected to a control unit. As a result, there can be up to 16 host processors connected into the one control unit, although redundancy requirements generally limit the number of host processors. In the same configuration, the control unit can be connected to 64 DASD; however, for purposes of the instant invention, it makes little difference how many channels or how many DASD are connected to the control unit and therefore the simplified scheme, as shown in FIG. 1, is sufficient for explaining the environment of this invention.

Control unit 12 contains all of those electronic circuits, microprocessors and microcode needed to manage the data transfer between the channels and the DASD. Such devices are well known, and only a portion of the circuits within the control unit 12 are illustrated in FIG. 1. FIG. 1 shows a control storage 14 which contains control registers 15 and a data buffer 16. Control storage 14, and the various buffers and registers therein, are connected to, and controlled by, a channel interface processor 17, a device interface processor 18 and an unusual situation processor 19. Both channel processor 17 and device processor 18 have access to the data buffer 16, and may also have access to other storage areas, such as cache storage, not shown in FIG. 1. It should be noted that device processor 18 and channel processor 17 can be separate processors or they can be implemented as separate processes operating on the same processor 20. Implementation as separate processors, or as separate microcode modules on the same processor, is a matter of choice dictated primarily by speed and cost considerations. The terms "Device Interface Processor" and "Device Interface Process" are synonymous as used herein, as are the similar terms for "Channel Interface Process" and "Channel Interface Processor".

Figure 2:
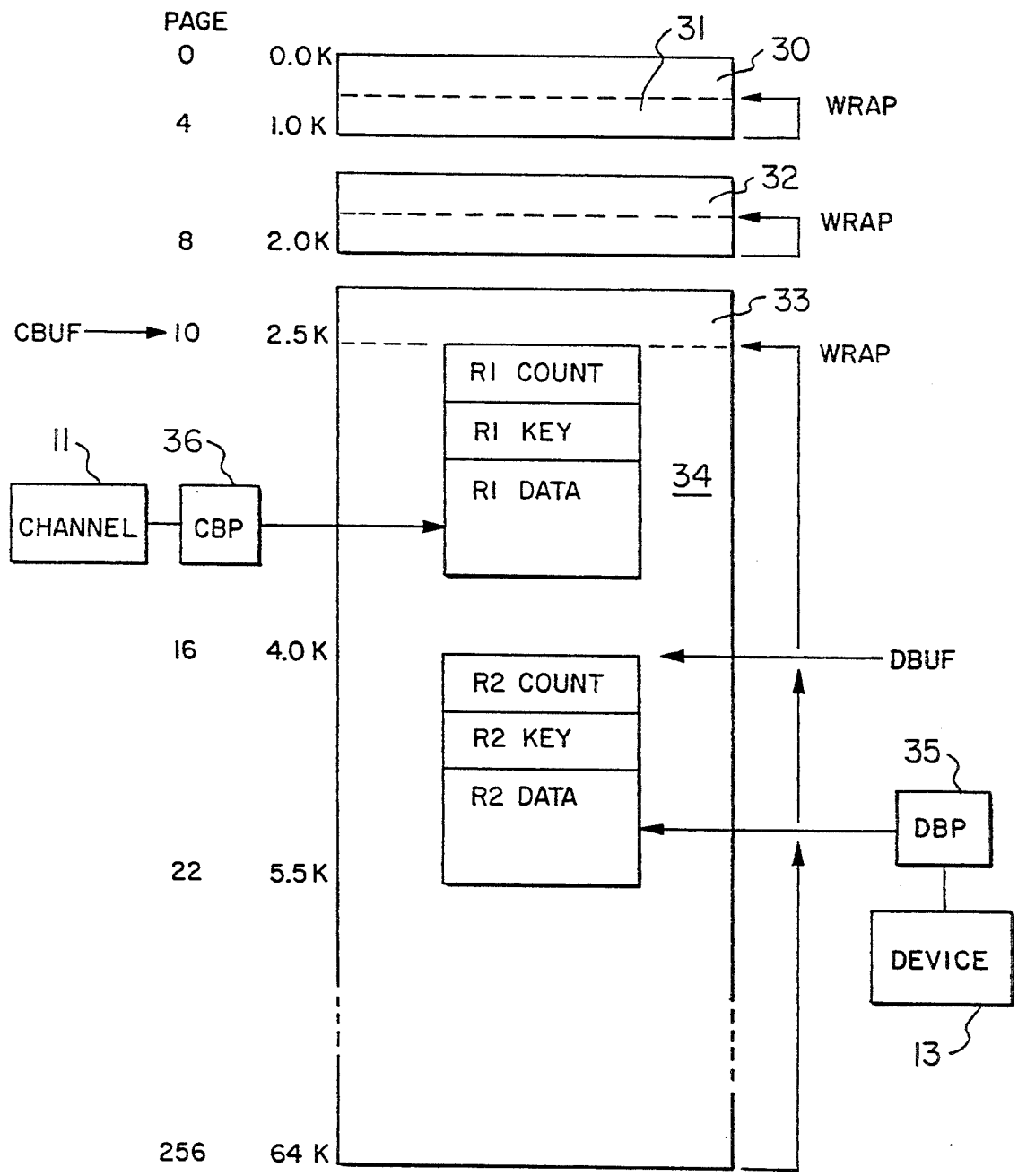
FIG. 2 shows a layout of the buffer shown in FIG. 1.

FIG. 2 shows the layout of data buffer area 16. In the implementation shown in FIG. 2, 64K bytes are included in the data buffer with a first 1.0K area separate and distinct from the area between 1.0K and 2.0K with that second area separate and distinct from the main portion of the buffer extending from 2.0K through 64K. In that manner, certain separate activities can go on in the three separate portions of the buffer. For example, in portion 30, control commands may be placed in the protected area, while cache and the channel data transfer can occur in the wrap area 31. Area 32 can be used for error correction.

The main 62K portion of the buffer is that portion of the buffer utilized for transferring data between the device and channel. Count fields on write operations (and key fields on branching operations when the key field is not updated) may be located in the protected area 33 while the data goes in the remaining 61.5K area, 34, termed hereafter the wrap area. Illustrated in FIG. 2 are the various records being transferred to or from the device and channel. As illustrated, the device 13 is currently accessing the data field of record 2 and a Device Buffer Pointer (DBP) 35 points to that particular location in the record 2 data field. Similarly, FIG. 2 illustrates that channel 11 is currently accessing data from record 1 and a Channel Buffer Pointer (CBP) 36 contains the address of the wrap data field in record 1. This graphically depicts, in nonsynchronous operation, the fact that the device 13 and the channel 11 may be operating on different records.

FIG. 2 can be used to illustrate some communication problems in nonsynchronous operation. For example, let us suppose that a read operation is underway; therefore, the device process 18 leads the channel process 17. With reference to FIG. 2, record 1 has been transferred into the buffer and the device process is currently transferring record 2 from the device into the buffer. The channel process 17 is currently transferring record 1 data from the buffer to the channel. If for some reason the trailing channel process 17 were to catch up with the leading device process 18 and pass it by, channel 11 would then be receiving meaningless data. Similarly, if the leading device process were to reach the end of the buffer and wrap back around to read more records into the buffer beginning at the top at 2.5K, the device process might eventually overtake the channel process and pass it by, in which case, the channel would not receive all of the records for which it had issued its read commands. This illustrates that communicating mechanisms must be installed in the system to prevent these situations from occurring.

For proper communication between the channel process or processor (CHIP) and the device process or processor (DIP), there are defined mechanisms. These mechanisms include two track pointers and two buffer pointers.

The two track pointers are named Channel Orientation Record and Field (CORF) and Device Orientation Record and Field (DORF). CORF indicates the intended operating position on the track for the channel process (CHIP), while DORF indicates where DIP is on the track. By comparing these two pointers, the relative positions of the channel program and the device can be ascertained.

CORF and DORF each consist of two elements: (1) A record count (CORF.R and DORF.R), and (2) a field identifier (CORF.F and DORF.F). These parameters are maintained in the storage control registers 15, except that DORF.R is also stored with the record in data buffer 16 for read operations.

A record count of one or two indicates the associated process is operating on a home address, or record zero, respectively. Other values in the record count are useful to determine the relative positions of CHIP and DIP, but do not necessarily relate to specific records on the track. The DORF field identifier (DORF.F) located in control registers 15, indicates the exact field on which DIP is operating. Normally, the parameter is changed by DIP; however, when errors occur in the data field, after they are corrected by the unusual situation processor 19, the processor will change DORF.F to a special value to indicate to the channel process that the data field is valid and that it should not wait for DIP to advance to the next record. If the data is for the last CCW in the command chain, time is saved that would otherwise be spent waiting for DIP to reorient to the record.

Whereas the DORF.F parameter indicates the exact field on which DIP is operating, the CORF.F parameter indicates the next desired field on which CHIP will operate.

There are two buffer pointers which are named the Channel Buffer Record pointer (CBUF) and the Device Buffer Record pointer (DBUF). CBUF is set by CHIP to indicate the buffer address of a record CHIP is currently processing. DBUF is set by DIP to indicate the buffer address of a record DIP is currently processing. These two pointers, together with the Buffer Wrap Around (WRAP) parameter are used by both CHIP and DIP to control the filling and emptying processes so that the two processes do not overlay each other. CBUF and DBUF and WRAP are maintained in the control storage registers 15. Referring to FIG. 2, note that the pointer DBUF points to the location at the beginning of the record being processed by DIP, that is, record R2, while CBUF points to the address at the beginning of the record being processed by CHIP, that is, record R1. At this point, it should also be noted that the buffer is divided into 256-byte pages and each record placed into the buffer starts on a page boundary. Therefore, record R1 begins at page 10, while record R2 begins at page 16. CBUF and DBUF will always point to an address in the buffer at a page boundary, while the Device Buffer Pointer (DBP) 35 and the Channel Buffer Pointer (CBP) 36 point to the location of the device, or channel, within the record.

As stated above, a mechanism is needed to communicate between DIP and CHIP so that the two processes do not overlay each other in processing data in the buffer. The buffer is divided into 256-byte pages so that a page address can be contained in a one-byte register. Each record starts on a page boundary. The page address that CHIP is working on is placed in the CBUF register. The page address that DIP is working on is placed in the DBUF register. These two registers are used to allocate space in the buffer so that the two processes do not interfere.

For write operations, CHIP advances CBUF at completion of data transfer for each record. For read operations, CHIP advances CBUF when the next CCW is received for a new record. DIP advances DBUF when the data field has been transferred for both read and write operations.

Each time that CHIP or DIP wrap CBUF or DBUF to the beginning of the buffer, the WRAP parameter is toggled. A WRAP value of zero indicates that CHIP and DIP are on the same pass through the buffer. A WRAP value of one indicates that the filling process has wrapped from the end of the buffer to the front, and the emptying process has not.

On a read operation, DIP stores records into the buffer and advances DBUF. For each record that DIP stores in the buffer, it stores DORF.R with the record. When CHIP searches for the records it wants, it compares CORF.R with DORF.R in the buffer for that record. If the comparing result is equal, CHIP transfers the record to the channel; otherwise CHIP advances CBUF to the next record and compares again until a match or an index is found.

On read operations, DIP is the buffer filler, and CHIP is the buffer emptier. CBUF, DBUF and WRAP are used as described in FIG. 3, Table 1, to prevent DIP from overlaying records in the buffer that are still required by CHIP. Table 1 shows that if the WRAP bit is zero, it is alright for DIP to proceed. However, if the WRAP bit is one, DBUF must be compared with CBUF and if DBUF is less than CBUF, it is alright for DIP to proceed since this indicates that DIP is operating on a page which has already been processed by CHIP. However, if WRAP is one and DBUF is equal to or attempts to be greater than CBUF, then it is necessary for DIP to halt processing. The device will then be required to reorient; that is, a lost rotation will occur.

On write operations, Table 1 shows that if the WRAP bit is zero, it is alright for CHIP to proceed in filling the buffer. If the WRAP bit is one and CBUF is less than DBUF, it is alright for CHIP to proceed in filling the buffer. However, if the WRAP bit is one and CBUF is equal to or attempts to be greater than DBUF, then CHIP must wait until DIP has completed its write operations before filling that buffer space with the next record.

Table 2, FIG. 3, shows rules for removing data from the buffer. In this case, on read operations if the WRAP bit is one, CHIP can proceed to remove all of the records to the end of the buffer. However, if the WRAP bit is zero on read operations, and if DBUF is greater than CBUF, then CHIP can proceed to remove records; but if CBUF is equal to DBUF, then CHIP must wait. Table 2 shows particular implementing rules for waiting to read count, key, and data fields.

On write operations, Table 2 shows that if WRAP is one, it is alright for DIP to proceed writing records to the end of the buffer. If the WRAP bit is zero, it is alright for DIP to proceed if CBUF is greater than DBUF. However, if CBUF is equal to DBUF, then DIP must wait for the Next Operating Field Valid (NOFVAL) bit to equal one before it proceeds. If the WRAP bit is zero and CBUF is less than DBUF, DIP must wait.

Note that the control bit NOFVAL, when set, indicates that CHIP has completed the count field, set up the Next Operating Field (NOF) in the buffer and loaded the Channel Buffer Pointer (CBP) 36 to block the Device Buffer Pointer (DBP) 35 during the data transfer.

To summarize, on read operations, DIP goes through the buffer letting in records and building the track image. When DIP gets to the end of the buffer, it wraps to the top and keeps on going. CHIP follows along behind. CBUF and DBUF are used to coordinate between CHIP and DIP.

When a write operation is to be performed, a locate record instruction informs the control unit 12 of the number of records that are to be written in the domain but the control unit will not know what the count fields are for the records. They may be on the same tracks, or they may be on different tracks. The channel interface processor commences to transfer the records from the channel to the buffer, while the device interface processor orients the device to write the first of the records to be transferred. While DIP is orienting, CHIP goes ahead and transfers records into the buffer; it might do the entire data transfer of several records before DIP has completed orienting. When DIP is oriented, DIP inspects the NOF, finds out what to do and steps down through the buffer writing the data to the device. When DIP reaches the last record to be written, the intent count for the domain will equal one thus enabling DIP to inform CHIP when it has completed the write. Also, DIP can inform the unusual situation processor in case error recovery is needed. In nonsynchronous operation, the successive write operations are performed by CHIP to the end even though DIP might encounter an error on one of the intermediate records. The intent count will indicate the number of records yet to be written to the device when the error occurred.

At the end of a successful write operation, a write domain complete byte is set signaling CHIP that the write operation has been successful and CHIP can go on to other business. The next thing DIP does is to switch immediately into read mode. This is done in a completely interlocked manner so that there are no timing problems in switching DIP from write operations to read operations.

It should be noted that there is an additional collision avoidance mechanism CBP 36 and DBP 35, shown in FIG. 2. When CHIP and DIP are working on the same record, these two pointers are implemented such that they cannot cross one another. Therefore, the trailing process is halted until there is time to allow the leading process to get ahead so that they can simply follow one another.

Also, during write operations, DIP needs to know the size of the key and data fields. The count field is copied by DIP into the protected area shown at 33 in FIG. 2. A Buffer Page General Register pointer (BFPGR) is set to point to where the count field is in the protected area. Therefore, on write commands, BFPGR points to the protected area, while DBUF points to wherever the data field is. DBUF wraps around the buffer, while BFPGR always points to a spot in the protected area.

Another important communicating element between the device and channel in a nonsynchronous system is a bit called the Reorient bit that is set by DIP whenever the device is reorienting; that is, searching for the correct record location in the device. Since it may take several milliseconds for the device to orient to the correct record, when CHIP gets to the point that it is waiting for DIP to proceed in the buffer, CHIP inspects the Reorient bit, and if that bit is set, then CHIP knows that DIP is in a reorienting condition. Since several milliseconds is a very long length of time for a channel to sit idle, CHIP will release the channel for other work. When DIP finally reorients and turns the Reorient bit off, CHIP gets the channel back and the process proceeds.

This communicating element is also used by the unusual situation processor for error recovery. When DIP has a problem, it shuts down, sets an error signal and waits. When this happens, CHIP may eventually run into DIP, similar 16 to the situation on a reorient. However, if CHIP completes its operation prior to running into DIP in the buffer, there is no reason to stop CHIP simply because DIP is in error. Therefore, CHIP proceeds, completes the process, and releases the channel for other work. The fact that DIP is in error is transparent to the channel.

Unusual Situation Processor (USURP) 19, must decide what to do in an error recovery situation and if it determines that command retry is necessary, it notifies CHIP and DIP of the situation. When the retry commences, CHIP begins over again and DIP goes through a reorientation setting the Reorient bit until the reorientation is complete. When it is, the Reorient bit is turned off and the operation is restarted.

As stated above, the main purpose of the Unusual Situation Utility and Recovery Process (USURP) 19 is to recover from errors detected by either CHIP or DIP. When DIP detects an error it will exit almost immediately to USURP 19 for an error analysis. This is done by DIP notifying CHIP that there is an error and CHIP notifying USURP 19 of the fact that DIP is in error. This technique is used to allow CHIP to respond to errors seen only by DIP. When CHIP detects an error, it also exits to USURP 19.

Errors fall into one of three basic categories. Retryable errors are those errors that can be retried by the control unit without causing data integrity problems. For example, overruns, data checks, or seek checks. Non-retryable errors are those errors that cannot be retried by the control unit such as equipment checks, invalid sequence, etc. When non-retryable errors are discovered, the processors will eventually terminate. The third category is not really an error but rather an "assist". Assists are special conditions that require unusual actions that are outside of the normal capabilities of CHIP or DIP. When an assist is needed by CHIP or DIP, USURP 19 provides the needed support. This will occur for activities such as cylinder crossing and defective/alternate track substitution.

As stated above the basic design of USURP 19 is to handle one error at a time until all errors reported by CHIP and DIP have been handled. If after all processors have been quiesced, only one process has reported an error, then USURP 19 handles that error at once. If both CHIP and DIP report an error, then USURP 19 will attempt to handle one and defer the other. Whenever possible, USURP 19 will handle the error presented by the trailing process and defer the error reported by the leading process. The goal is to allow the trailing process to catch up to the leading process and end up with only the one error to handle, the one reported by the leading process and deferred to this point.

However, some errors cannot be deferred. For example, a check 2 error reported by the leading process must be handled even though the trailing process is also reporting an error. Check 2 errors are handled at once because these types of errors are distinguished from other errors because they effect both CHIP and DIP and therefore must be handled before either can continue. Therefore, a check 2 error will be serviced by USURP 19 first, even if the leading process was the only one to detect it.

Another case in which the leading process error must be considered first is when a read operation is in effect and CHIP, the trailing process, requests an assist while the leading process, DIP, detects a device error. In such case, the device error must be handled first before responding to CHIPs request for an assist. Again, while assists may not be considered errors, they are treated in the same fashion by USURP 19.

Still another at least partial exception to the general rule of handling the error from the trailing process first is the situation in which both processes are reporting assists. In this situation, USURP 19 will handle the two assists together. This occurs on read operations and is done in order to save an extra revolution on every cylinder crossing which otherwise would occur due to the reconnect and disconnect time of handling the trailing process assist first and then the leading process.

Another partial exception to the general rule is that when both processes detect check 2 errors, the errors are handled together by assigning the check 2 to the trailing process. The leading process error code is reset since the error will already have been handled once.

An attempt has been made to keep the reporting of errors consistent between synchronous and non-synchronous control unit implementations. To do that, the non-synchronous reporting scheme uses the number of recovered data checks and the number of bytes read to control the reporting of errors. In the case, for example, on a read operation where CHIP does not require the field on which DIP is reporting an error, a reporting control block is still built. When USURP 19 returns control to DIP, DIP will be allowed to clock the field which results in the error being treated as recovered. Therefore, retryable errors on fields the channel is not interested in will be treated as recovered. This combined with counting all bytes read from the device makes the error rate reporting equivalent to synchronous implementations.

As stated above, it is desired to cause the non-synchronous control unit to approximate the synchronous control unit operation for error processing. To do that, when one process has shut down due to an error, USURP 19 will wait until the other process has also shut down before error recovery is started. Thus, whenever CHIP 17 exits to USURP 19, USURP will either see that DIP 18 had already stopped with an error or it will let DIP run to completion (empty the buffer on writes) or instruct DIP to stop at the next opportunity (on reads). Once DIP has stopped, USURP 19 will begin recovery operations. To implement this approach, when CHIP detects an error, and DIP is running, USURP 19 will notify DIP to stop through either the FINISHDIP signal or the STOPDIP signal. These signals are located in control storage 14.

FINISHDIP is used for write operations and notifies DIP to shut down. However, DIP will not shut down immediately but rather will empty the buffer before it enters the idle state.

In a read operation USURP 19 sets STOPDIP when CHIP detects an error and waits for DIP to shut down. DIP is expected to test for STOPDIP as soon as possible.

When DIP exits to USURP 19 with an error, CHIP is notified that DIP has shut down in the error state. CHIP may continue to process records until it needs DIP to advance further. Then CHIP will exit to USURP 19. If a read operation is underway, it is possible for CHIP to complete reading all of the records that it needs before it catches up to DIP. As noted above, DIPs error will then be handled.

CHIP and DIP may shut down on different records or fields. They may have two different errors because one continued running and encountered a new error after the other had detected its own error. If both of the errors are retryable, then each might require a different set of recovery actions. The general rule is, that if the trailing process error is retryable, then USURP 19 will handle that error, restart the trailing process and defer handling the error reported by the leading process until the operation can go no further. At that point, the single error can be handled in much the same manner that an error in a synchronous system is handled. This process will now be more fully described with respect to FIGS. 4, 5 6 and 7.

Figure 4:
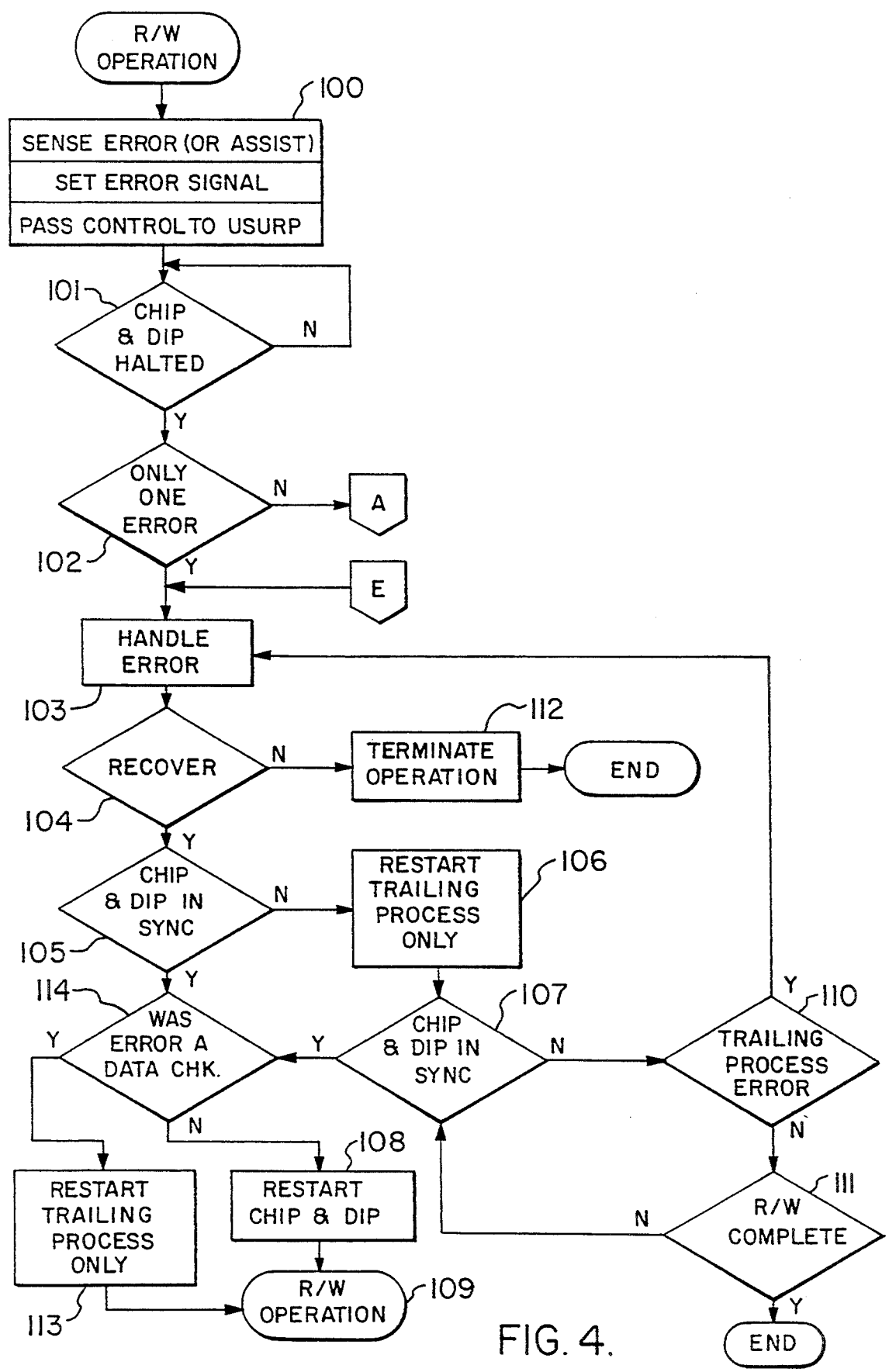
FIG. 4 shows the error recovery process of this invention when a single error has been sensed.

FIG. 4 shows the error recovery process for retryable errors where only a single error is reported. FIG. 4 shows the reporting of the error at step 100 during a read/write operation. When DIP gets an error, detects STOPDIP or FINISHDIP, or requests an assist, control is passed to USURP 19 to set the error signal to indicate these conditions. When CHIP gets an error, detects DIP in error, times out waiting for DIP, or requests an assist, control is passed to USURP 19 to set the error signal to indicate these conditions. Next, at step 101 USURP waits until CHIP and DIP shut down in response to the error signal set by USURP, USURP 19 then tests for the number of errors at step 102. If more than one error has been noted, a branch is taken to the process shown on FIG. 5. With only one error, USURP 19 will handle that error as shown at step 103. If recovery is unsuccessful, the termination operation is performed at step 12. If recovery is successful at step 104, USURP 19 then determines at step 105 whether DIP and CHIP are operating in synchronism, i.e., has the trailing process caught up with the leading process, in which case they are in synchronism. If the trailing process has not caught up, only the trailing process is restarted at step 106. If the trailing process empties the buffer and catches the leading process step 107, or if the two processes are found to be in sync at step 105, a determination is made whether the error which has been successfully recovered was a data check. If it was, the data field in the buffer is now corrected and valid. In such case, only the trailing process is restarted at step 113 since it may now be possible to complete the data transfer requested by the command chain on a read operation without restarting DIP. This feature was discussed above concerning the setting of DORF.F to a special value to indicate a corrected data check error. That special value is queried at step 114. If the corrected error was not a data check as determined at step 114, the leading process is restarted together with the trailing process for a resumption of normal read or write operations. This is shown at steps 108 and 109. Returning to step 106, after the trailing process is restarted, it may encounter an error before catching up to the leading process or it may complete the operation before catching up. At step 110, when an error is encountered, return is made to step 103 for handling an error and restarting the trailing process in the manner described above. If no error is encountered and the operation is successfully completed as shown at step 111, exit is made.

Figure 5:
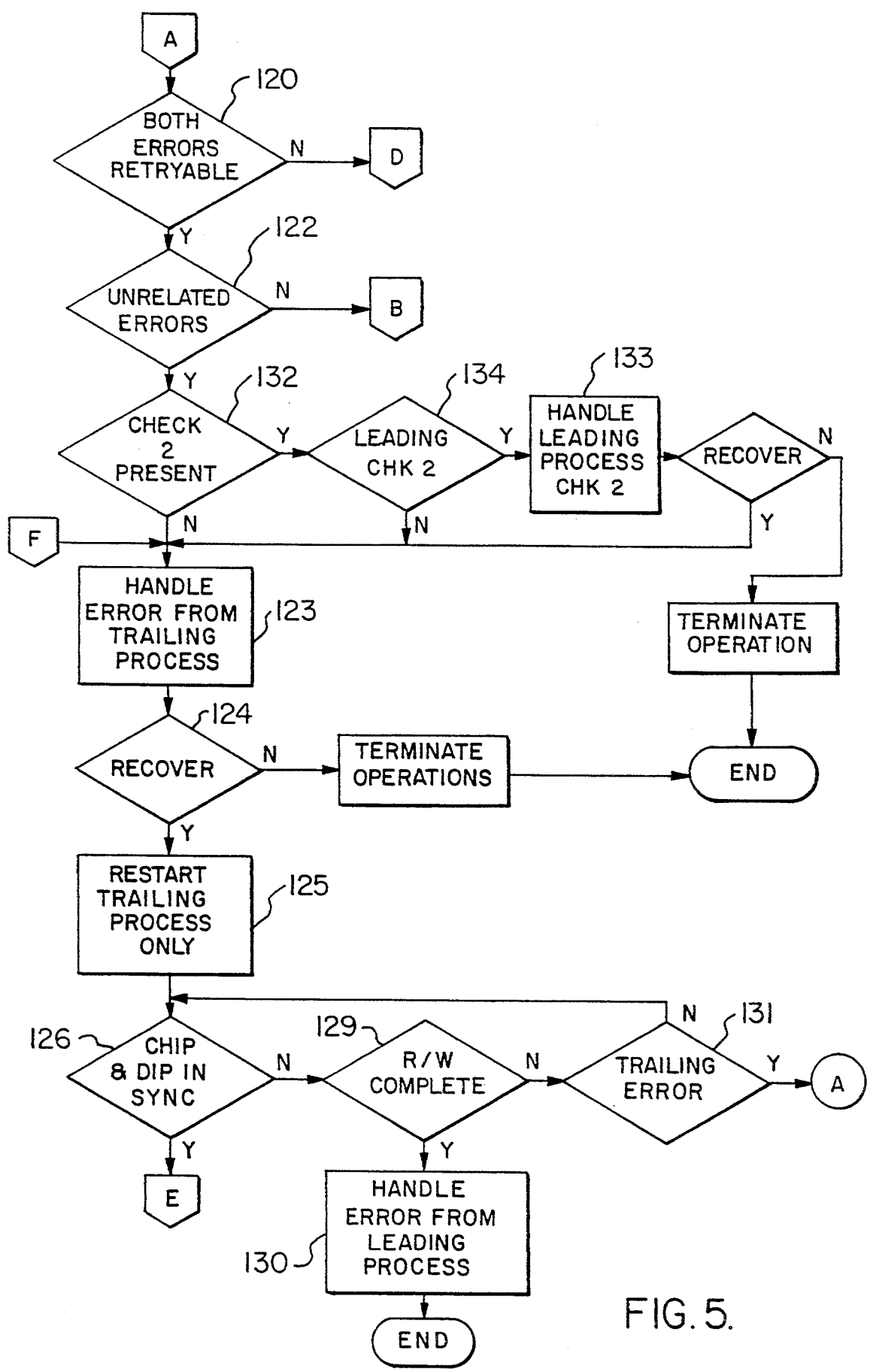
FIG. 5 shows the error recovery process of this invention when multiple unrelated errors are sensed.

The process shown in FIG. 5 is the error recovery process where both CHIP and DIP have reported errors to USURP and USURP determines that both of the errors are retryable at step 120. It should be noted that if one or both of the reported errors is a check 2 error, it will be assumed to be retryable at step 120, even though not all such errors can actually be retried. Should one of the errors not be retryable, a branch is made to the process shown on FIG. 8. Where two errors are reported and both are retryable, USURP 19 then determines that the errors are either related or unrelated at step 122. If the errors are related, or if one or both are assists, a branch is made to the error recovery process shown in FIG. 6. If the errors are unrelated, USURP then determines whether either process is reporting a check 2 error at step 132. If the leading process is reporting a check 2 error, an exception is made to the general rule and the check 2 error is handled at step 133. This is done because neither CHIP nor DIP can proceed while a check 2 error exists. If recovery is successful, the error reported by the trailing process is handled at step 123. At step 134, if USURP determines that the check 2 error was reported by the trailing process, or if no check 2 errors were reported at step 132, then the error from the trailing process is handled at step 123 and if recovery at step 124 is successful, only the trailing process is restarted at step 125. This will enable the trailing process to catch up to the leading process, and when it does, at step 126, return is made to step 103, FIG. 4, for handling the remaining error, the one reported by the leading process. If the leading process error has been handled at step 133, steps 103 and 104 will note the recovery, and the process will restart both CHIP and DIP at step 108. However, at step 129, should the trailing process complete the read/write operation prior to catching up to the leading process, the error noted by the leading process is handled at step 130 and the operation successfully ended. If the trailing process encounters an error before catching up to the leading process as shown at step 131, a branch is made to step 120 to handle the new error and continue the process.

Figure 6:
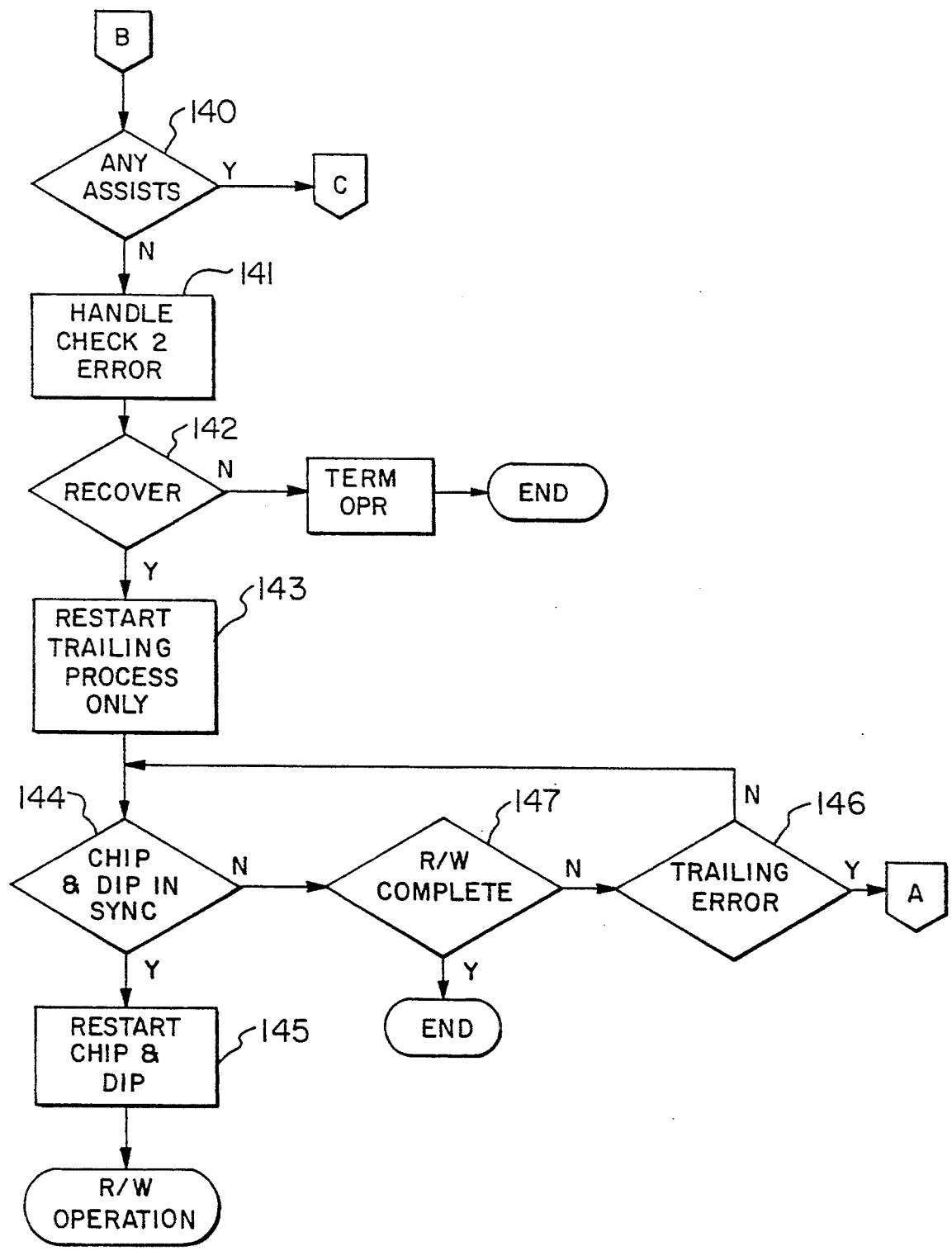
FIG. 6 shows the error recovery process of this invention when related errors are sensed by both CHIP and DIP.

FIG. 6 shows the error recovery process where the two errors are related. At step 140 USURP determines whether either process is reporting an assist. If assists are required, a branch is made to the process shown in FIG. 7. Where no assists are required for the two related errors, they will involve check 2 errors since check 2 errors are those types of errors which affect both processors. The check 2 error is handled at step 141, and upon successful recovery at step 142 the trailing process only is restarted as shown at step 143. Once the trailing process catches up to the leading process at step 144, the two processes are in synchronism. Both CHIP and DIP are restarted at step 145. This will involve handling the error from the leading process at that time. Since the related check 2 error has already been corrected, this step merely involves starting up CHIP and DIP. Thus, the goal of handling only one error at a time is implemented. Again, at step 144, if the trailing process has not yet caught up to the leading process, the operation may terminate successfully at step 147. However, if the trailing process encounters an error before catching up to the leading process as shown at step 146, a branch is made to step 120, FIG. 5, to handle the new error and continue.

Figure 7:
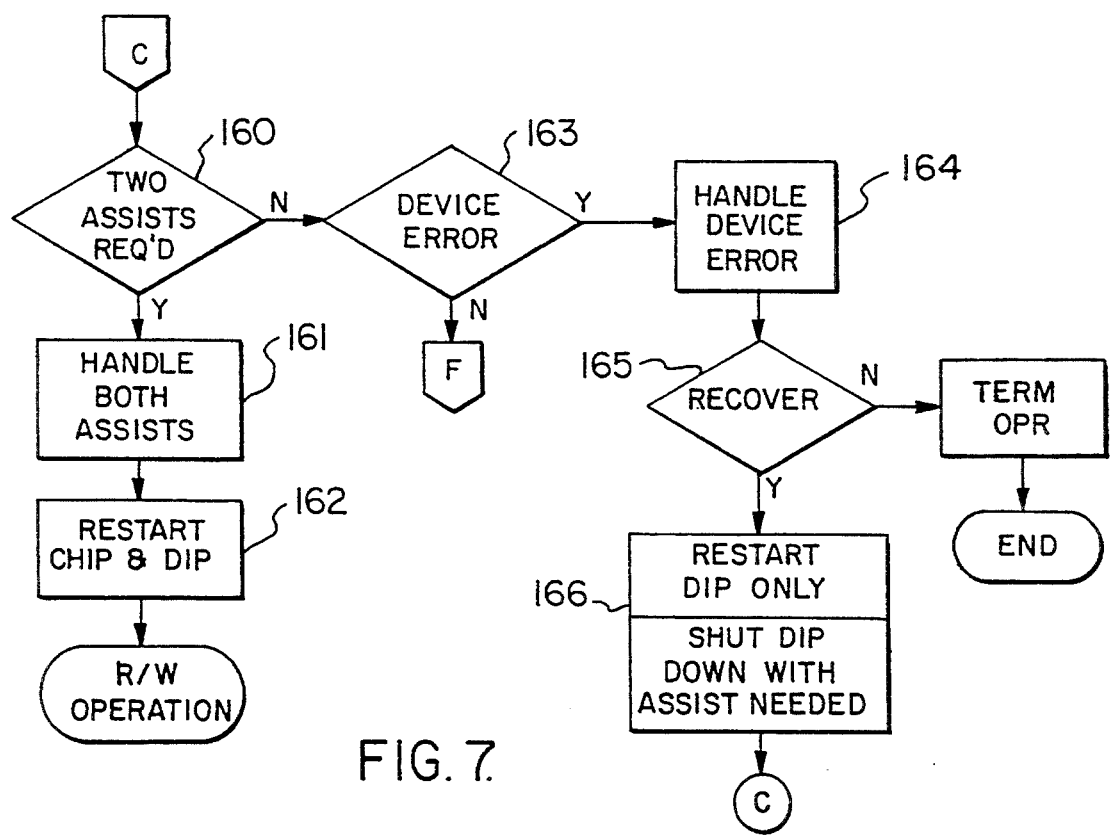
FIG. 7 shows the error recovery process of this invention when it is requested to provide an assist (or two assists) to CHIP or DIP.

Should the two errors be found to include an assist at step 140 a branch is made to the process shown on FIG. 7 in order to handle assists. At step 160 USURP determines whether two assists are requested. If they are, then both assists are handled at step 161 and both processes are restarted at step 162. If the determination at step 160 is that one assist has been requested, then the other process is sensing an error. If that error is a device error, as shown at step 163, the device error must be handled at step 164 before handling the assist. This becomes an exception to the general rule if the leading process is the process halted because of the device error. If successful recovery is made from the device error at step 165, DIP is restarted and quickly shutdown at step 166. This is done to ensure that all DIP problems and parameters are settled after the device error. A branch is then made to step 160 for handling the two outstanding assists. Returning to step 163, if the error is found not to be a device error as shown at step 163, then the error and the assist are treated in normal fashion, that is, a branch is made to step 123, FIG. 5, and the error or the assist from the trailing process is handled, the trailing process is restarted, and the leading process waits for the trailing process to catch up before its assist or error is handled.

Figure 8:
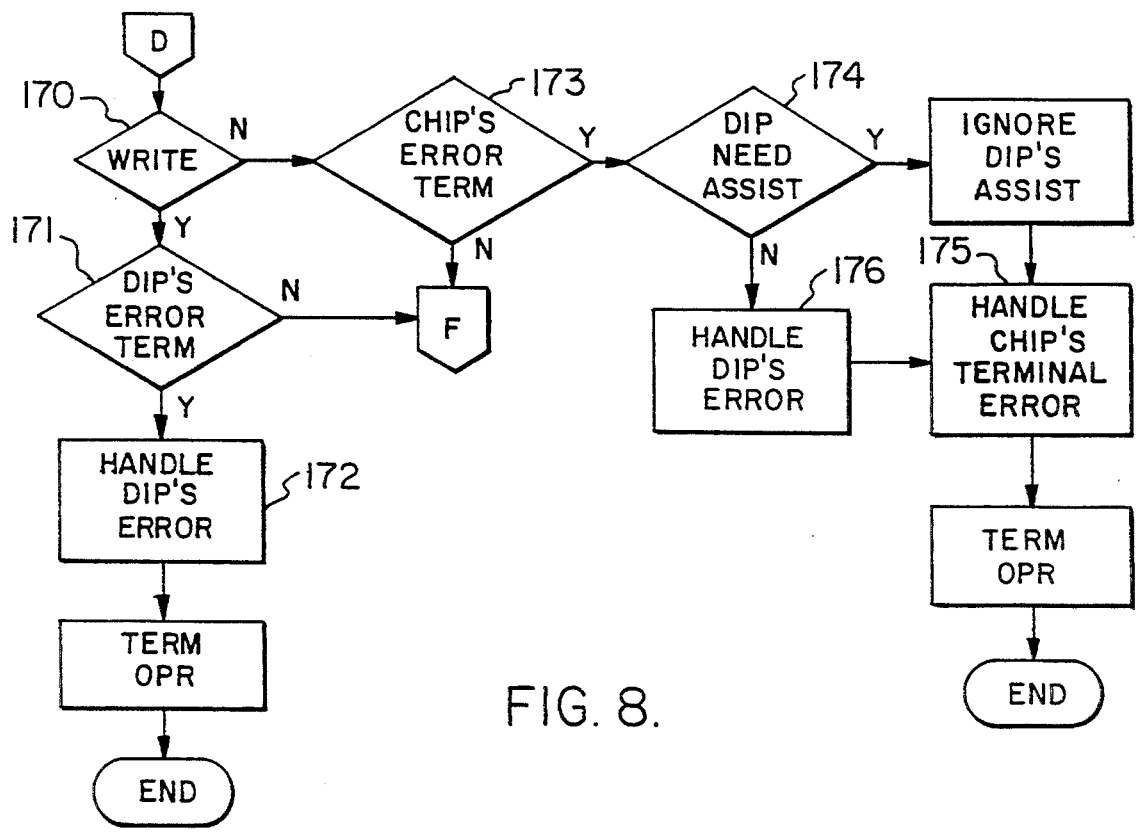
FIG. 8 shows the error recovery process of this invention when one of two reported errors is terminal.

FIG. 8 shows the error recovery process when at least one of two reported errors is not retryable, i.e., terminal. At step 170, USURP determines whether a write operation is in process. If it is, and the terminal error is reported by DIP as determined at step 171, the error is handled at step 172 and the operation terminated. If the terminal error is not reported by DIP, then a return is made to step 123 for handling DIP's non-terminal error. CHIP's terminal error is eventually handled when DIP catches up to CHIP; this also results in a termination of the process.

If the operation is determined to be a read at step 170, USURP determines at step 173 whether CHIP's error (the trailing process) is terminal. If not, return is made to step 123 on FIG. 5 for handling CHIP's error. Upon recovery, CHIP is restarted and continues to operate as shown in FIG. 5. There is the possibility that CHIP will complete the read operation successfully before catching up to DIP with its terminal error.

If the error reported by CHIP is terminal as determined at step 173, then USURP, at step 174, determines whether DIP's error is a request for assistance. If it is, DIP's assist request is ignored and CHIP's terminal error is handled at step 175 and the process terminated. If DIP is reporting an error, rather than an assist, its error will be handled at step 176, then CHIP's terminal error will be handled and the process terminated.

While we have illustrated and described the preferred embodiment of our invention, it should be understood that we do not limit ourselves to the precise constructions herein disclosed and the right is reserved to all changes and modifications coming within the scope of the invention as defined in the appended claims.

What is claimed is:

1. In a machine-effected method of operating a Direct Access Storage Device (DASD) peripheral data storage system, said system containing a Device Interface Processor (DIP), a DASD, a Channel Interface Processor (CHIP), a channel, an Unusual Situation Utility Recovery Processor (USURP), control registers, and a buffer storage, wherein said DIP controls the transfer of data between recording tracks on said DASD and said buffer; wherein said CHIP controls the transfer of data between channel and said buffer in a manner that is not synchronous with the data transfer performed by said DIP; wherein said USURP controls error recovery operations; wherein said CHIP operates as a leading process on write operations to place data in said buffer while said DIP operates as a trailing process to remove data from said buffer; wherein said DIP operates as a leading process on read operations to place data in said buffer while said CHIP operates as a trailing process to remove data from said buffer, including the machine-executed steps of:

sensing an error condition and setting an error signal;
waiting for both said leading process and said trailing process to halt operations;
determining whether said error is retryable, if it is determining whether only one error has been sensed by either of said processes, if it has, handling said error and upon recovery if said leading and said trailing processes are in synchronism, restarting both said processes; and
if said processes are not in synchronism, restarting said trailing process only and transferring data through the operation of said trailing process until said trailing process either 1) catches up to said leading process in said buffer, then restarting said leading process as well as continuing the operation of said trailing process, or 2) successfully completing all required data transfer prior to catching up to said leading process or 3) sensing an error prior to catching up to said leading process.

2. In the method of claim 1, wherein an error is sensed by said trailing process prior to catching up to said leading process further including the steps of:

halting the data transfer of said trailing process,
determining whether said error is retryable, if it is;
recovering from said error and upon recovery,
restarting said trailing process, then repeating the steps of claim 2.

3. In a machine-effected method of operating a Direct Access Storage Device (DASD) peripheral data storage system, said system containing a Device Interface Processor (DIP), a DASD, a Channel Interface Processors (CHIP), a channel, an Unusual Situation Utility Recovery Processor (USURP), control registers, and a buffer storage, wherein said DIP controls the transfer of data between recording tracks on said DASD and said buffer; wherein said CHIP controls the transfer of data between a channel and said buffer in a manner that is not synchronous with the data transfer performed by said DIP; wherein said USURP controls error recovery operations; wherein said CHIP operates as a leading process on write operations to place data in said buffer while said DIP operates as a trailing process to remove data from said buffer; wherein said DIP operates as a leading process on read operations to place data in said buffer while said CHIP operates as a trailing process to remove data from said buffer, including the machine-executed steps of:

sensing an error condition and setting an error signal;
waiting for both said leading process and said trailing process to halt operations;
determining whether said error is retryable, if it is determining whether only one error has been sensed by either of said processes, if it has, handling said error and upon recovery if said leading and said trailing processes are in synchronism, restarting both said processes; and
if said processes are not in synchronism, restarting said trailing process only, and when it is determined that both the leading process and the trailing process have sensed error conditions, further including the machine-executed steps of:
determining that both errors are retryable;

determining that the errors are unrelated;

handling the error from the leading process only if it interferes with the continued operation of the trailing process;

handling the error from the trailing process; and upon recovery restarting the trailing process only, leaving the leading process halted in error.

4. In the method of claim 3, for a read operation, wherein said restarted trailing process (CHIP) catches up to said leading process (DIP) in the processing of data in said buffer, then handling the error from the leading process and if the error had occurred in the data field, upon correction of the field, further including the machine-implemented steps of;

indicating to said CHIP that the data field is valid determining whether the corrected data field is the last field needed in said read operations, and if it is, restarting said trailing process only thereby avoiding the need to restart DIP.

5. The method of claim 3 wherein said restarted trailing process catches up to said leading process in the processing of data in said buffer, then handling the error from the leading process and upon recovery restarting both CHIP and DIP.

6. The method of claim 3 wherein said restarted trailing process successfully completes all required data transfer prior to catching up to said leading process, further including the machine-implemented step of;

handling the error from the leading process.

7. The method of claim 3 in which it is determined that both errors are retryable and the errors are related, then;

handling the error, and upon recovery, restarting said trailing process only to allow said trailing process to catch up to said leading process, then restarting said leading process as well as continuing the operation of said trailing process.

8. A control unit for a Direct Access Storage Device (DASD), said control unit connected to a channel and to a DASD, wherein data records previously stored on said DASD are read into a buffer storage from a beginning location to a final location in a buffer filling operation and read from said buffer onto said channel in a buffer emptying operation, said filling operation capable of operating in a non-synchronous manner with respect to said emptying operation that is, operating on different data records from said emptying operation at any particular point in time, said control unit comprising:

said buffer storage;

a Device Interface Processor (DIP) connected to said buffer for controlling the transfer of data records from said DASD to said buffer storage;

a Channel Interface Processor (CHIP) connected to said buffer storage for controlling the transfer of data records from said buffer to said channel, said CHIP processor organized to trail said DIP processor in said buffer storage in order to access data records previously placed in said buffer storage by said DIP; and an Unusual Situation Processor (USURP) interconnected with said buffer, said DIP and said CHIP for controlling error recovery operations, said USURP including means for waiting for both said CHIP processor and said DIP processor to halt operations upon reporting of an error condition to said USURP; said USURP further including means for determining whether said CHIP and said DIP are halted in synchronism and means for restarting only said CHIP if said DIP and said CHIP are not in synchronism.

9. The control unit of claim 8 wherein said USURP processor further includes means for determining that both said DIP processor and said CHIP processor have halted on unrelated error conditions;

means for determining that an error sensed by said DIP does not interfere with the continued operation of said CHIP; and means for restarting said CHIP leaving said DIP halted in error.

10. The control unit of claim 9 further including means for halting said CHIP processor on the location where said DIP processor is halted;

means for handling the error reported from said DIP processor;

means for indicating to CHIP that the data field upon which both processors are halted is valid;

means for determining whether the valid data field is the last field needed to complete the read operation and, if it is, means for restarting only said CHIP.

11. A control unit for a Direct Access Storage Device (DASD), said control unit connected to a channel and to a DASD, wherein data records on said channel are read into a buffer storage from a beginning location to a final location in a buffer filling operation and read from said buffer onto said DASD in a buffer emptying operation, said filling operation capable of operating in a non-synchronous manner with respect to said emptying operation that is, operating on different data records from said emptying operation at any particular point in time, said control unit comprising:

said buffer storage;

a Channel Interface Processor (CHIP) connected to said buffer storage for controlling the transfer of data records from said channel to said buffer storage;

a Device Interface Processor (DIP) connected to said buffer storage for controlling the transfer of data records from said buffer to said DASD, said DIP processor organized to trail said DIP processor in said buffer storage in order to access data records previously placed in said buffer by said CHIP;

an Unusual Situation Processor (USURP) interconnected with said buffer, said CHIP and said DIP for controlling error recovery operations, said USURP including means for waiting for both said CHIP processor and said DIP processor to halt operations upon reporting of an error condition to said USURP, said USURP further including means for determining whether said CHIP and said DIP are halted in synchronism on the same location in said buffer;

means for restarting only said DIP if said CHIP and said DIP are not in synchronism.

12. The control unit of claim 11 wherein said USURP processor further includes means for determining that an error sensed by said CHIP does not interfere with the continued operation of said DIP; and means for restarting said DIP leaving said CHIP halted in error.

* * * * *

UNITED STATES PATENT AND TRADEMARK OFFICE
CERTIFICATE OF CORRECTION

PATENT NO. : 5,446,872
DATED : August 29, 1995
INVENTOR(S) : Ayres et al.

It is certified that error appears in the above-indentified patent and that said Letters Patent is hereby corrected as shown below:

```
Col. 14, line 33:  change "2" to --1--
Col. 16, line 45:  change "DIP" to "CHIP"
```

Signed and Sealed this

Seventeenth Day of February, 1998

Attest:

BRUCE LEHMAN

Attesting Officer

Commissioner of Patents and Trademarks